United States Patent [19]

Wagner et al.

[11] Patent Number: 5,538,679
[45] Date of Patent: Jul. 23, 1996

[54] PROCESS OF MAKING MOLDED PRODUCTS

[75] Inventors: Joachim Wagner; Werner Rasshofer; Eberhard Jürgens, all of Köln; Ulrich Eisele, Leverkusen, all of Germany

[73] Assignee: Bayer Aktiengesellschaft, Leverkusen, Germany

[21] Appl. No.: 381,604

[22] Filed: Jan. 27, 1995

Related U.S. Application Data

[63] Continuation-in-part of Ser. No. 187,958, Jan. 28, 1994, abandoned, which is a continuation-in-part of Ser. No. 168,698, Dec. 16, 1993, abandoned, which is a continuation of Ser. No. 436,529, Nov. 14, 1989, abandoned.

[30] Foreign Application Priority Data

Nov. 29, 1988 [DE] Germany ................... 38 40 167.3

[51] Int. Cl.⁶ .................. C08G 18/65; C08J 5/00
[52] U.S. Cl. .............. 264/331.19; 264/41; 264/45.1; 264/122; 264/126; 264/248; 264/308; 264/321
[58] Field of Search ................ 264/41, 45.1, 122, 264/126, 248, 321, 331.19, 308; 156/62.2, 78, 242, 308.2

[56] References Cited

U.S. PATENT DOCUMENTS

| | | | |
|---|---|---|---|
| 3,354,251 | 11/1967 | Thoma et al. | 264/210.5 |
| 3,794,621 | 2/1974 | Meckel et al. | 528/64 |
| 4,065,410 | 12/1977 | Schafer et al. | 521/51 |
| 4,261,946 | 4/1981 | Goyert et al. | 264/211 |
| 5,009,950 | 4/1991 | Wagner et al. | 428/290 |
| 5,064,600 | 11/1991 | Wagner et al. | 264/328.6 |
| 5,154,871 | 10/1992 | Wagner et al. | 264/255 |

FOREIGN PATENT DOCUMENTS

| | | |
|---|---|---|
| 81701 | 6/1983 | European Pat. Off. . |
| 2622951 | 11/1977 | Germany . |
| 3132760 | 3/1983 | Germany . |
| 3733756 | 4/1989 | Germany . |
| 3809524 | 10/1989 | Germany . |

OTHER PUBLICATIONS

Macosko, C. W. *Fundamentals of Reaction Injection Molding*. New York, 1989, pp. 1–72.

Becker/Braun, *Kunststoffhandbuch*, vol. 7, 1983, pp. 405–417.

*Primary Examiner*—Leo B. Tentoni
*Attorney, Agent, or Firm*—Joseph C. Gil

[57] ABSTRACT

The invention relates to a process for the preparation of single-layered or multilayered molded articles from particles of polyisocyanate-polyaddition products by shaping a specified mixtures under heat and pressure. The mixture contains quasi-thermoplastic particles of polyisocyanate-polyaddition products and one or more processing aids.

6 Claims, No Drawings

PROCESS OF MAKING MOLDED PRODUCTS

CROSS-REFERENCE TO RELATED APPLICATIONS

This application is a continuation-in-part of U.S. application Ser. No. 08/187,958, filed on Jan. 28, 1994, now abandoned which in turn was a continuation-in-part of U.S. application Ser. No. 08/168,698, filed on Dec. 16, 1993, now abandoned, which in turn was a continuation of U.S. application Ser. No. 07/436,529, filed on Nov. 14, 1989, now abandoned.

BACKGROUND OF THE INVENTION

This invention relates to an improved process for the preparation of single-layered or multilayered molded articles from certain polyisocyanate polyaddition products by shaping such products under heat and pressure and to the molded articles thereby obtained.

According to published German patent application 3,733,756, molded articles can be prepared by thermoplastic shaping of granulates, shavings, or other small and very small particles of the kind obtained from the preparation and processing of polyisocyanate polyaddition products. According to published German patent application 3,809,524, complex structures and laminates can be prepared from such small particles and used either as such or in the form of semi-finished goods produced by a separate step.

It has been found, however, that disintegration may occur if materials differing substantially in their properties, for example, in their surface tension, are to be molded together in a single complex material. This problem can arise, for example, when using materials differing greatly in their hardness or materials formulated to be readily releasable from the mold and containing internal mold release agents. Such disintegration may also occur, for example, when lacquered and unlacquered materials are to be bonded together.

It is, therefore, an object of the present invention to provide an improved process by which all types of size-reduced polyisocyanate polyaddition products of the type mentioned below can be joined to form composite materials, regardless of their chemical composition and their physical properties.

It has surprisingly been found that the problem described above can be solved with the aid of certain processing auxiliaries described below.

DESCRIPTION OF THE INVENTION

The present invention relates to a process for the preparation of single-layered or multilayered molded articles comprising shaping a mixture under conditions of heat and pressure, said mixture comprising:

(i) quasi-thermoplastic particles of a polyisocyanate-polyaddition product prepared by reacting, in a single stage or multistage process at an isocyanate index of from about 60 to about 140,
  (a) an aliphatic, cycloaliphatic, or aromatic polyisocyanate;
  (b) a compound having a molecular weight of from 1800 to 12,000, and containing on statistical average at least 2.4 isocyanate-reactive groups;
  (c) at least 5% by weight, based upon the weight of component (b), of a compound selected from the group consisting of:
    (1) diamines having molecular weights of from 108 to 400 and having primary aromatically bound amino groups and/or secondary aromatically bound amino groups, and
    (2) non-aromatic compounds having molecular weights of from 60 to 1799 and containing at least two isocyanate-reactive groups, with the proviso that the amounts and types of components (b) and (c) are such that the molar ratio of urea groups to urethane groups in said polyisocyanate-polyaddition product is at least 2:1, and (ii) one or more processing auxiliaries selected from the group consisting of solvents that swell the surface of said polyisocyanate-polyaddition product, compounds that undergo an addition or condensation reaction with said polyisocyanate-polyaddition product, radical formers, and thermoplastic materials.

The phrase "quasi-thermoplastic particles" as used herein is defined to mean particles which do not pass through a liquid or molten state upon application of heat, but soften to the extent that they are moldable upon application of heat and pressure. "Thermoplastic" materials, on the other hand, do pass through a liquid or molten state upon application of heat. More particularly, the melt temperature ("Tm"), as determined by Differential Scanning Calorimetry, of a thermoplastic material is above room temperature, but is below the decomposition temperature ("Td"), determined by thermogravimetric analysis. A thermoplastic material forms a flowable melt at temperatures between Tm and Td. A melt flow index (i.e., a measurement of the quantity of material flowing from a vessel at specified temperatures and pressures, as measured by ASTM-D-569-82) of greater than zero is observed for thermoplastic materials at temperatures between Tm and Td at an applied pressure of 20 bars. In contrast, a quasi-thermoplastic material is defined as a material which does not have a Tm below its Td. There is no temperature below Td in which a quasi-thermoplastic material melts and is in the form of a flowable melt. Over the entire temperature range of from room temperature to Td, there is no measurable melt flow index at an applied pressure of 20 bars. Accordingly, a quasi-thermoplastic material is defined as a material for which there is no measurable melt flow index at an applied pressure of 20 bars over the entire temperature range of from room temperature to Td.

The invention also relates to the molded articles prepared by the process of the invention.

The process according to the invention not only enables widely differing polyurethane materials or poly(urethane)urea materials to be combined without preselection but often also enables the shaping to be carried out under much milder operating conditions. The small and very small particles to be used in the process according to the invention may be, for example, granulates, shavings, sawdust, or other small and very small particles of polyisocyanate-polyaddition products based on the starting materials mentioned above. In classical RIM technology, it was believed that the chemical reaction had to be conducted in closed molds having the shape of the final product. The present invention allows for the carrying out of the chemical reaction in molds of any shape, and the subsequent shaping after the chemical reaction(s) is (are) complete.

Suitable aromatic polyisocyanates for the preparation of the polyisocyanate-polyaddition products include, in particular, the compounds described in published European patent application 81,701 at column 3, line 30, to column 4, line 25, of which the polyisocyanates mentioned as preferred are also preferred for the purpose of the present invention.

Suitable aliphatic and cycloaliphatic polyisocyanates (a) include any organic diisocyanates having molecular weights above about 137 (preferably from 168 to 290) and containing only aliphatically or cycloaliphatically bound isocyanate groups. Examples of suitable aliphatic and cycloaliphatic diisocyanates include 1,6-diisocyanatohexane, 1,12-diisocyanatododecane, 1,3-diisocyanatocyclobutane, 1,3- and 1,4-diisocyanatocyclohexane and any mixtures of these isomers, 1-isocyanato-3,3,5-trimethyl-5-isocyanatomethylcylcohexane ("IPDI"), 2,4'- and/or 4,4'-diisocyanatodicyclohexylmethane, and mixtures of such polyisocyanates. Also suitable are polyisocyanates based on the aliphatic or cycloaliphatic diisocyanates exemplified above (or mixtures thereof) that are modified with urethane, allophanate, isocyanurate, urea, biuret, or uretdione groups. Mixtures of unmodified diisocyanates with the above-mentioned modified polyisocyanates may also be used as component (a).

Component (b) consists of compounds having molecular weights of from about 1800 to about 12,000 (preferably from 3000 to 7000) containing isocyanate-reactive groups, or of mixtures of such compounds. The compounds used as component (b) have an (average) functionality in isocyanate addition reactions greater than 2.5 (preferably from 2.6 to 3.0 and most preferably from 2.8 to 3.0). In accordance with this definition, polyether polyols and mixtures of polyether polyols disclosed in German Auslegeschrift 2,622,951 at column 6, line 65, to column 7, line 47, are particularly suitable compounds for use as component (b). Also preferred are polyether polyols in which at least 50% of the hydroxyl groups (preferably at least 80%) are primary hydroxyl groups. The hydroxyl-containing polyesters, polythioethers, polyacetals, polycarbonates, and polyester amides disclosed as examples in German Auslegeschrift 2,622,951 are in principle also suitable for use as component (b), provided they conform to the conditions mentioned above, but are less preferred than polyether polyols.

Suitable starting components (b) also include aminopolyethers and mixtures of aminopolyethers conforming to the above conditions, that is, polyethers containing isocyanate-reactive groups and comprising at least 50 equivalents percent (preferably at least 80 equivalents percent) of primary and/or secondary aromatic or aliphatic (preferably aromatic) amino groups, with the remainder being primary and/or secondary aliphatic hydroxyl groups. Examples of suitable aminopolyethers of this type include compounds described in published European patent application 81,701 at column 4, line 26, to column 5, line 40.

Polyesters in the above-mentioned molecular weight range containing amino groups are also suitable as starting component (b) but are less preferred.

Mixtures of the polyhydroxyl compounds described above with the aminopolyethers may, of course, also be used as component (b).

Component (c) consists of a compound selected from the group consisting of (1) diamines having molecular weights of from 108 to 400 and having primary aromatically bound amino groups and/or secondary aromatically bound amino groups, and (2) non-aromatic compounds having molecular weights of from 60 to 1799 and containing at least two isocyanate-reactive groups.

Aromatic diamines of the type described in published European patent application 81,701 at column 5, line 58, to column 6, line 34, of which the diamines mentioned as preferred are also preferred for the purpose of the present invention. Preferred aromatic diamines include diethyltolylene-diamines or isomeric mixtures thereof, especially a mixture of 65 percent by weight 1-methyl-3,5-diethylphenylene-2,4-diamine and 35 percent by weight 1-methyl-3, 5-diethylphenylene-2,6-diamine ("DETDA").

Examples of useful non-aromatic compounds include non-aromatic compounds having molecular weights of from about 60 to about 1799 (preferably from 62 to 500 and especially from 62 to 400) containing at least two isocyanate-reactive groups. Examples of such compounds include polyhydric alcohols such as those described in published European patent application 81,701 at column 9, lines 32 to 50. Other suitable compounds include aliphatic polyamines containing ether groups, such as polypropylene oxides in the above-mentioned molecular weight range containing primary amino end groups. Also suitable are cyclo-aliphatic-containing polyols, such as 1,4-dihydroxycyclohexane and 1,4-bis(hydroxymethyl)cyclohexane, and polyamines, such as 1,4-cyclohexanediamine, isophoroneodiamine, bis(4-aminocyclohexyl)methane and bis(3-methyl-4-aminocyclohexyl)methane.

The amount of component (c) is at least 5% by weight (preferably at least 10% by weight), based upon the weight of component (b). The nature and quantitative proportions of components (b) and (c) are chosen so that the molar ratio of urea groups to urethane groups in the polyisocyante-polyaddition product is at least 2:1, and is most preferably at least 5:1.

Auxiliary agents and additives may also be in the preparation of polyisocyanate-polyaddition products. These include, for example, internal mold release agents, catalysts for the polyisocyanate-polyaddition reaction, blowing agents, surface-active additives, cell regulators, pigments, dyes, UV stabilizers, plasticizers, and fungistatic or bacteriostatic substances, such as those described in published European patent application 81,701 at column 6, line 40, to column 9, line 31. When used, the preferred auxiliary agents and additives include known fillers and/or reinforcing substances, such as barium sulfate, kieselguhr, whiting, mica, and especially glass fibers, liquid crystal fibers, glass flakes, glass balls, aramide fibers, and carbon fibers. These fillers and/or reinforcing materials may be added in quantities of up to 80% by weight (preferably up to 30% by weight) based on the total quantity of filled or reinforced polyisocyanate-polyaddition products.

The polyisocyanate-polyaddition products are preferably prepared by the one-shot process in which polyisocyanate component (a) is mixed with components (b), (c) and any auxiliary agents and additives in a suitable mixing apparatus, where the mixed components react. It is also possible in principle to react the polyisocyanate-polyaddition products by a "modified one-shot process" in which polyisocyanate component (a) is reacted with part of component (b) and, optionally, part of component (c) to form isocyanate semiprepolymers which are then reacted with the mixture of the remaining components in a single stage. The polyisocyanate-polyaddition products can also be prepared by the well-known prepolymer process. The isocyanate index (number of isocyanate groups divided by the number of isocyanate-reactive groups and multiplied by 100) is always from about 60 to about 140 (preferably from 80 to 120 and more preferably from 95 to 115).

The quasi-thermoplastic polyisocyanate-polyaddition materials used for the process according to the invention are most preferably small or very small particles of the kind obtained from the production and use of molded articles based on polyisocyanate-polyaddition products obtained from the aforesaid starting materials. In the past, such materials have been disposed of by burning.

The processing auxiliaries (ii) of the invention may be a "solvent type", a "reactive type", or a "thermoplast type" or may be radical formers.

Suitable processing auxiliaries of the solvent type cause the surface of the polyisocyanate-polyaddition products to swell, thereby rendering them softer and more plastic. Examples of such agents include alcohols, such as methanol, ethanol, propanol, isopropyl alcohol, and higher alcohols; diols, such as ethylene glycol and glycol monoethers and monoesters; ether solvents, such as dioxane, tetrahydrofuran, and dimethoxyethane; halogenated hydrocarbons; ketones and lower aliphatic aldehydes, optionally in an acetal or ketal form; esters, such as ethyl acetate; and aprotic polar solvents, such as acetonitrile, dimethylacetamide, dimethylformamide, dimethyl sulfoxide, dimethyl sulfone, and tetramethylurea.

Suitable processing auxiliaries of the reactive type include, for example, the type which reacts with the polyisocyanate-polyaddition products by the formation of chemical bonds, in particular by an addition reaction with the active hydrogen atoms present in the polyisocyanate-polyaddition products. Examples include organic polyisocyanates of the type described above for starting component (a) above, prepolymers containing isocyanate groups obtained from polyisocyanates, and compounds containing isocyanate-reactive groups of the type described for component (b), as well as compounds containing epoxide groups of the type known from the chemistry of epoxide resins, such as the known reaction products of bisphenol-A and epichlorohydrin. Also suitable as processing auxiliaries of the reactive type are phenol resins, melamine resins, and other formaldehyde resins, provided they are capable of undergoing a condensation reaction with the polyisocyanate-polyaddition products.

Suitable processing auxiliaries also include radical formers, particularly peroxidic processing auxiliaries of the kind used as radical starters for the processing of rubber. Particularly suitable are peroxidic processing auxiliaries which have a short half life compared with the molding time at the most preferred molding temperatures. Examples include lauroyl peroxide, dilauroyl peroxide, cumene hydroperoxide, t-butyl peroxide, di-t-butyl peroxide, t-butyl perbenzoate, t-butyl hydroperoxide, benzoyl peroxide, dibenzoyl peroxide, ethyl methyl ketone peroxide, and dicumyl peroxide (e.g., Perkadox SB of Akzo), as well as other radical formers, such as 2,2'-azobis(2-methylpropionitrile).

The processing auxiliaries of the reactive type and the radical formers may be used in either the liquid or the solid form, but when used as solids they must become fluid at the stage of shaping under heat and pressure. Solid processing auxiliaries may also be introduced as a suitable solution using a solvent that preferably is capable of wetting the granulate and of escaping before processing or, at the latest, during processing.

Suitable processing auxiliaries of the thermoplastic type are mainly thermoplastic resins that are themselves thermoplastically processible under the conditions of the process of the invention and in which the polyisocyanate-polyaddition products become embedded when the process of the invention is carried out. As noted above, such thermoplastic materials pass through a liquid or molten state upon application of heat. Examples of suitable auxiliary agents of this type include polyolefines, aromatic polyether esters, polycarbonates, and other thermoplastically processible materials.

The shaping of the mixture is generally carried out under a pressure of at least 5 bar (preferably in the pressure range of from 50 to 400 bar) at a temperature of at least 50° C. (preferably at 100° to 200° C.). The molding times under these conditions may be from about 1 second to about 10 minutes.

The shaping may be carried out in apparatus conventionally used for this purpose, such as deep drawing presses, rolling mills, calendaring rollers, presses, modified extruders, and modified injection molding apparatus. When using modified apparatus, the modifications must be such that the particles of granulate can be forced into a given mold at the filling pressure in a substantially unmolten state. Examples of such modifications include the use of a large outlet die and large conveyor channels in the extruder or injection molding machine and in the channels leading into the mold. Shearing forces occurring shortly before or during the process of filling the mold help to keep the molded products together.

The processing auxiliaries (ii) required for the invention are preferably added before the molding process to the polyisocyanate-polyaddition products that are to be shaped. Under these conditions, the small or very small particles of polyisocyanate-polyaddition product become intimately mixed with the processing auxiliaries. Combinations of various processing auxiliaries may be used for carrying out the process of the invention, in which case the processing auxiliaries (ii) may be added to the small particles of polyisocyanate-polyaddition product either as a mixture or individually in sequence. The processing auxiliaries (ii) are generally used in a quantity of from about 0.01 to about 50% by weight (preferably from 1 to 10% by weight) based on the weight of the polyisocyanate-polyaddition products.

The mixture used in the process of the invention may be mixed with (iii) additional auxiliary agents which serve to improve the properties of the resulting composite products. These additional auxiliary agents may include, for example, antistatic agents, flame-retardants, agents for increasing the electric conductivity, reinforcing materials such as glass or carbon fibers, or fillers such as barium sulfate or mica.

The products obtained by the process of the invention may be finished parts or articles or they may be semi-finished goods that may be converted into finished articles in a further process step, either alone or in combination with any other materials.

The process according to the invention allows the preparation of particularly high quality composite products, especially composite sheet products suitable for a wide variety of applications. Thus, the composite products prepared according to the invention may be used, for example, in the form of hollow bodies for use as linings, beakers, and containers of various dimensions and capacities, as facings for dashboards and switchboards, as flat pads of car body elements such as door panels, side pads, mudguards, hoods, or trunk lids, and as wheel caps. In a flat form, the composite bodies are also suitable for use as writing surfaces, indicator boards with magnetic holders, adhesive labels, protective films, and coatings for various purposes. Products obtained by the process of the invention may also be used in the form of small pads not previously economically obtainable by the RIM process, such as keyboards pads, rigid elastic sealing pads and sleeves, handles and recessed grips, small damping elements, and washers and spacer discs. The products of the process of the invention may also be used for the manufacture of reinforced or unreinforced cable duct sections and sealing lips or for the production of any other solid small articles.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius, all pads are pads by weight, and all percentages are percentages by weight.

EXAMPLES

Preparation of a polyisocyanate-polyaddition product (polyurea-based molded part)

The formulation described below was processed as follows to prepare molded parts:

Apparatus: Laboratory piston dosing apparatus
Mold: Steel plate mold, internal dimensions 300×200×4 mm
Mixing head: MQ 8 mixing head of Hennecke, Sankt Augustin
Operating pressure: 180 bar
Filling time: 1 second
Temperature of raw materials
A component: 65° C.
B component: 50° C.
Mold temperature: 70° C.
Residence time in mold: 30 seconds
External mold release agent: RCTW 2006 Chemtrend A Component:

| A Component: | |
|---|---|
| 58.6 parts | an aromatic amino polyether (NH number of 44) prepared by the hydrolysis at 90° C. of an isocyanate prepolymer using a mixture of 3.5 parts by weight of dimethylformamide, 0.1 part by weight of sodium hydroxide, and 100 parts by weight of water per 1000 parts by weight of the prepolymer, followed by removal of the volatile components by distillation |
| 28.8 parts | DETDA |
| 0.9 parts | commercial stabilizer based on a polyether polysiloxane (L 5430 of Union Carbide); |
| 5.6 parts | a mixture of equal parts by weight of (i) zinc stearate and (ii) the product of addition of 5 mol of propylene oxide to 1 mol of ethylene diamine (internal mold release agent); |
| 6.1 parts | a high molecular weight polyricinoleic acid having an acid number below 5 as internal mold release agent |

The isocyanate prepolymer (isocyanate content 3.4%) was obtained by the reaction of 2,4-diisocyanatotoluene with a subequivalent quantity of a polyether mixture. The polyether mixture consisted of equal parts by weight of (i) the propoxylation product (OH number 56 and OH functionality 2.4) of a mixture of water and trimethylolpropane and (ii) a polyether polyol (OH number 35) prepared by the propoxylation of glycerol followed by the ethoxylation of the propoxylation product (ratio by weight PO:EO=87:13).
B Component:
Desmodur M 53 (polyester-modified 4,4'-diisocyanato-diphenylmethane having an isocyanate content of 19% by weight; product of Bayer AG).

Components A and B were worked up under the operating conditions indicated above at an isocyanate index of 100 to produce plates having a density of 1.15 g/cm³.
Preparation of a granulate:
A granulate with an average particle size of 2 to 3 mm was prepared in a cutting mill from the plates described above.

In the following Examples 1 to 4, the granulate particles were compressed to 4-mm thick plates in a closed plate mold using a laboratory press (Model 200 T press of Schwabenthan) for 2 minutes at 180° C. at a pressure of 350 bar. The plates were cut into rods which were used to determine the elongation at break and resistance to breakage in the tension test (see Table below).

Example 1

Untreated granulate described.

Example 2

The granulate described above mixed with 10% by weight, based on the polyisocyanate-polyaddition product, of a granulate of a commercial thermoplastic polyurethane (Desmopan 359 of Bayer AG) having a particle size of 2 to 3 mm. The thermoplastic polyurethane has a Shore D hardness according to DIN 53,505 of 59, a modulus of elasticity according to DIN 53,455 of 160 mPa·s, a stress at break according to DIN 53,504 of 50 mPa·s, an elongation at break according to DIN 53,504 of 350%, and a density of 1.23 g/cm³.

Example 3

The granulate described above mixed with 10% by weight, based on the mixture, of an ABS granulate having a particle size of 2 to 3 mm. The ABS granulate was based on an acrylonitrile/butadiene/styrene copolymer having a Vicat softening temperature according to DIN 53,460 of 92° C. and a notched impact strength according to DIN 53,453 of 12 kJ/m².

Example 4

Particles of granulate completely wetted with a saturated solution of a polyisocyanate in toluene, dried in air, and then treated overnight with a saturated solution of dicumyl peroxide in heptane. The polyisocyanate was a polyisocyanate mixture of the diphenylmethane series having a viscosity of 200 mPa·s (23° C.). The remainder of the solvent was removed by drying in a drying cupboard (80° C., 1 h).

Example 5

A reference sample of undisturbed test body (unblended, original plate of polyisocyanate-polyaddition product of the type described above).

TABLE

| Example | Tensile strength at break (mPa) | Elongation at break (%) |
|---|---|---|
| 1 | 4 | 3 |
| 2 | 6 | 4 |
| 3 | 6 | 4 |
| 4 | 37 | 15 |
| 5 | 37 | 150 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a single-layered or multilayered molded article comprising shaping a mixture under conditions of heat and pressure, said mixture comprising:

i) quasi-thermoplastic particles of a polyisocyanate-polyaddition product prepared by reacting, in a single stage or multistage process at an isocyanate index of from about 60 to about 140,
  (a) an aliphatic, cycloaliphatic, or aromatic polyisocyanate;
  (b) a compound having a molecular weight of from 1800 to 12,000, and containing on statistical average at least 2.4 isocyanate-reactive groups;
(c) at least 5% by weight, based upon the weight of component (b), of a compound selected from the group consisting of:
  (1) diamines having molecular weights of from 108 to 400 and having primary aromatically bound amino groups and/or secondary aromatically bound amino groups, and
  (2) non-aromatic compounds having molecular weights of from 60 to 1799 and containing at least two isocyanate-reactive groups,
with the proviso that the amounts and types of components (b) and (c) are such that the molar ratio of urea groups to urethane groups in said polyisocyanate-polyaddition product is at least 2:1, and (ii) one or more processing auxiliaries selected from the group consisting of solvents that swell the surface of said polyisocyanate-poly-addition product, compounds that undergo an addition or condensation reaction with said polyisocyanate-polyaddition product, radical formers, and thermoplastic materials that can be processed under the conditions of the process.

2. The process of claim 1 wherein the shaping is carried out at a pressure of at least 5 bar.

3. The process of claim 2 wherein the shaping is carried out at a pressure of from 50 to 400 bar.

4. The process of claim 1 wherein the shaping is carried out at a temperature of at least 50° C.

5. The process of claim 4 wherein the shaping is carried out at a temperature of from 50° to 200° C.

6. The process of claim 1 wherein the shaping is carried out at a pressure of from 50 to 400 bar and at a temperature of from 50° to 200° C.

* * * * *